(No Model.)

G. W. PLATT.
BRAKE.

No. 342,460. Patented May 25, 1886.

Witnesses
C. W. Benjamin
M. L. Storer

Inventor
George W. Platt,
by Jacob L. Storer,
his Atty.

UNITED STATES PATENT OFFICE.

GEORGE W. PLATT, OF BROOKLYN, NEW YORK.

BRAKE.

SPECIFICATION forming part of Letters Patent No. 342,460, dated May 25, 1886.

Application filed January 25, 1886. Serial No. 189,601. (No model.)

*To all whom it may concern:*

Be it known that I, GEORGE W. PLATT, a citizen of the United States of North America, and a resident of Brooklyn, county of Kings, State of New York, have invented a new and useful Improvement in Brakes, of which the following is a specification.

The object of this invention is to provide a brake which shall be self-adjusting for applying equal pressure throughout its contact-face.

The invention consists of a lever and a dog directly attached, connected or fixed together by a universal joint, so that power applied to the lever shall be equally distributed, by reason of the self-adjustability of the dog, at every point of the contact-face of the dog, all of which will be hereinafter fully set forth.

Reference is to be had to the accompanying drawings, forming part of the specification, in which similar letters of reference indicate corresponding parts in all the figures.

Figure 1:
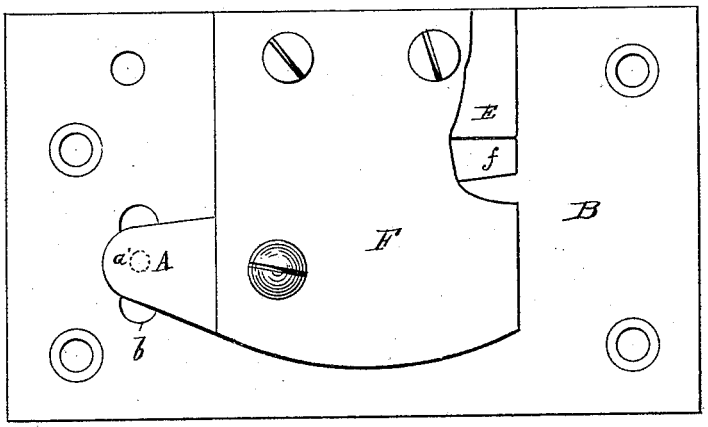
Figure 3:
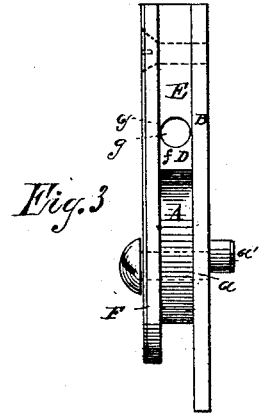
Figure 2:
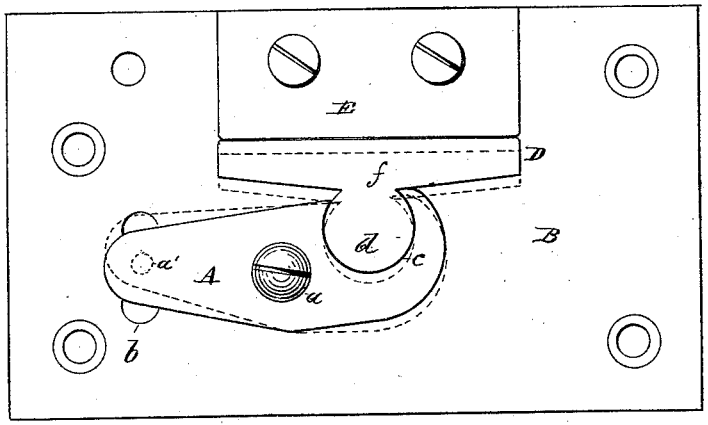

Figure 1 is a side elevation of my improved device, with part broken away to exhibit other parts. Fig. 2 is a side elevation of the same, with one plate removed, indicating two positions of the brake. Fig. 3 is an edge elevation of the same.

In the drawings, A represents the lever, pivoted at $a$ to a plate or other suitable support, B, and having in this instance a handle, $a'$, fixed at right angles to it, and extending out through a slot, $b$, in the said support B. In the end of the lever opposite the handle a segmental circular socket, $c$, is formed, in which is fitted or engaged the circular heel $d$ of the dog D, which is perpendicular to the face of the jaw $f$, which extends laterally in either direction parallel with the lever, so that the said dog has positive vertical motion in the plane in which the lever moves, and freedom of lateral motion for self-adjustment in the arc in which the dog's heel moves in the lever-socket.

The plate E, secured to the support B, represents an object for the dog D to operate upon or against. The contact-edges of the dog and of the object E may be grooved, as shown at $g$ $g$, Fig. 3, or they may be of any other desired shape, as may be best adapted for holding any object between them. A plate, F, secured over the plate B by screws or other convenient device, serves to keep the lever and dog in alignment.

I am aware of the United States Patent No. 284,451; but the universal joint shown in the modification therein does not nor is designed to operate to equalize the pressure of the dog throughout its contact-face; nor am I acquainted with any device resembling mine that proposes to accomplish the object of this invention.

Having thus described my invention, I claim as new and desire to secure by Letters Patent—

A brake, constructed substantially as herein shown and described, for applying equal pressure throughout its contact-face, consisting of a lever having a circular socket in one end, and of a dog having a corresponding circular heel perpendicular to its face fitted in said socket, whereby the said dog is enabled to have vertical motion in the plane in which the lever moves, and freedom of lateral motion for self-adjustment in the arc in which its heel moves in the lever-socket, as set forth.

In testimony that I claim the foregoing as my invention I have signed my name, in presence of two witnesses, this 8th day of January, 1886.

GEO. W. PLATT.

Witnesses:
JACOB J. STORER,
MARY L. STORER.